US005349003A

United States Patent [19]

Kato et al.

[11] Patent Number: 5,349,003
[45] Date of Patent: Sep. 20, 1994

[54] AQUEOUS FLUORINE-CONTAINING POLYMER DISPERSION AND AQUEOUS DISPERSION CONTAINING FLUORINE-CONTAINING POLYMER AND WATER-SOLUBLE RESIN AND/OR WATER DISPERSIBLE RESIN

[75] Inventors: Minoru Kato; Teruo Hiraharu; Koichi Nishiwaki; Hiroshi Tadenuma, all of Yokkaichi, Japan

[73] Assignee: Japan Synthetic Rubber Co., Ltd., Tokyo, Japan

[21] Appl. No.: 15,671

[22] Filed: Feb. 9, 1993

Related U.S. Application Data

[63] Continuation of Ser. No. 737,601, Jul. 25, 1991, abandoned, which is a continuation of Ser. No. 408,300, Sep. 18, 1989, abandoned.

[30] Foreign Application Priority Data

Sep. 20, 1988 [JP] Japan ................................. 63-235573
Mar. 13, 1989 [JP] Japan ................................. 1-59998
Aug. 7, 1989 [JP] Japan ................................. 1-204088

[51] Int. Cl.$^5$ ................................................ C08F 2/16
[52] U.S. Cl. ................................. 524/458; 524/545; 524/546
[58] Field of Search ................. 524/458, 545, 546; 523/201

[56] References Cited

U.S. PATENT DOCUMENTS

| | | | |
|---|---|---|---|
| 4,002,801 | 1/1977 | Knechtges et al. | 523/201 |
| 4,141,873 | 2/1979 | Dohany . | |
| 4,309,328 | 1/1982 | Carson et al. . | |

FOREIGN PATENT DOCUMENTS

| | | |
|---|---|---|
| 195661 | 9/1986 | European Pat. Off. . |
| 2104545 | 4/1972 | France . |
| 51-2099 | 1/1976 | Japan . |
| 54-15077 | 6/1979 | Japan . |
| 59-157159 | 9/1984 | Japan . |
| 63-312836 | 12/1988 | Japan . |

OTHER PUBLICATIONS

Database WPIL, NO75-85560W, Derwent Publications Ltd, London, GB; & JP-A-54015077 (Kureha Chemical Industry KK) 12 Jun. 1979 *Abstract*.
Chemical Abstracts, vol. 84, No. 4, 26 Jan. 1976 Columbus, Ohio, USA p. 132; right-hand column; ref. No. 19386M *Abstract & JP-A 50116582 (Kureha Chemical Industry Co Ltd) 11 Sep. 1975.
Database WPIL, NO73-74677U, Derwent Publications Ltd, London, GB; & JP-A-48052830 (Mitsubishi Ele Citric Corp) 23 Jan. 1976 *Abstract*.
Database WPI, NO89-041824, Derwent Publications Ltd, London, GB; & JP-A-63312836 (Honey Chem Ind KK) 21 Dec. 1988 *Abstract*.
Chemical Abstracts, vol. 80, No. 8, 25 Feb. 1974 Columbus, Ohio, USA p. 35; right-hand column; ref. No. 37912B *abstract* & JP-A-48008593 (Kureha Chemical Industry Co. Ltd. 13 Mar. 1973.

*Primary Examiner*—Joseph L. Schofer
*Assistant Examiner*—Peter D. Mulcahy
*Attorney, Agent, or Firm*—Oblon, Spivak, McClelland, Maier & Neustadt

[57] ABSTRACT

An aqueous fluorine-containing polymer dispersion having particle diameters of 0.05–3 $\mu$m, which is obtainable by emulsion-polymerizing 5–95 parts by weight of a monomer mixture consisting of at least one monomer selected from the group consisting of alkyl acrylates whose alkyl groups have 1–18 carbon atoms and alkyl methacrylates whose alkyl groups have 1–18 carbon atoms and optionally an ethylenically unsaturated compound copolymerizable with the alkyl acrylates and the alkyl methacrylates, in an aqueous medium in the presence of 100 parts by weight of particles of a vinylidene fluoride polymer; and an aqueous dispersion containing a fluorine-containing polymer which consists essentially of 95–30 parts by weight (in terms of solids content) of said aqueous fluorine-containing polymer dispersion and 5–70 parts by weight (in terms of solids content) of an aqueous dispersion of a water-soluble resin and/or a water-dispersible resin. The aqueous fluorine-containing polymer dispersion and the aqueous dispersion containing a fluorine-containing polymer have excellent heat resistance and weather resistance inherent in fluororesins and are significantly improved in film formability, transparency and adhesion to substrate. Therefore, these aqueous dispersions can be used as a coating composition for various applications, a fiber-treating compound, a paper-processing compound or a floor-coating compound.

25 Claims, No Drawings

AQUEOUS FLUORINE-CONTAINING POLYMER DISPERSION AND AQUEOUS DISPERSION CONTAINING FLUORINE-CONTAINING POLYMER AND WATER-SOLUBLE RESIN AND/OR WATER DISPERSIBLE RESIN

This application is a continuation of application Ser. No. 07/737,601, filed on Jul. 25, 1991, now abandoned, which was a continuation of application Ser. No. 07/408,300, filed on Sep. 18, 1989, now abandoned.

This invention relates to an aqueous fluorine-containing polymer dispersion and an aqueous dispersion containing a fluorine-containing polymer and a water soluble resin and/or a water-dispersible resin. More particularly, this invention relates to an aqueous fluorine-containing polymer dispersion and an aqueous dispersion containing a fluorine-containing polymer and a water-soluble resin and/or a water-dispersible resin, both the dispersions having excellent storage stability and excellent film formability and being capable of forming a film superior in adhesion to substrate, chemical resistance, mechanical strengths, etc.

These aqueous dispersions can be used as a coating compound, a fiber-treating compound, a paper-processing compound, a floor-coating compound, a carpet-backing compound, etc.

Fluororesins are very superior in chemical resistance and solvent resistance and, further, good in heat resistance, weather resistance, gas impermeability, radiation resistance, electrical insulation, etc. Therefore, studies have been made to widely utilize fluororesins as, for example, a lining compound, a corrosion-preventive compound, an impregnating compound for porous materials (e.g. asbestos sheet, glass fiber sheet, felt sheet, paper), a packing compound, a coating compound, a spraying compound to be applied onto surfaces requiring acid resistance, alkali resistance, electrical insulation or the like, a baking paint, a laminate film, a non-tackiness imparting compound for fiber, a water repellent compound and a floor-coating compound, etc.

The fluororesins are, however, poor in processability (e.g. film formability), require a baking treatment at high temperatures and consequently tend to cause film defects such as pin hole and the like. They are also inferior in adhesion to substrate, transparency and mechanical strengths (e.g. tensile strength). Therefore, the fluororesins are now used in limited applications and are not yet used for general purpose.

In order to remedy the above mentioned drawbacks of the fluororesins, there have been proposed, for example, a process for producing a powdery composition, which comprises copolymerizing methyl acrylate and isobutylene in the presence of a vinylidene fluoride polymer obtained by suspension polymerization (Japanese Patent Application Kokoku No. 54-15077), an aqueous dispersion of a fluorine-containing resin obtained by incorporating a water-soluble resin into a fluorine-containing random copolymer (Japanese Patent Application Kokai No. 62-158766) and a process for producing a composite material of a fluorine-containing polymer, which comprises (1) adding 100–500 parts by weight of an ethylenically unsaturated carboxylic acid ester and/or a monomer copolymerizable therewith to 100 parts by weight of a fine particle dispersion obtained by finely dispersing a fluorine-containing polymer using a surfactant and then (2) subjecting the resulting mixture to emulsion polymerization (Japanese Patent Application Kokai No. 63-312,836).

Japanese Patent Application Kokoku No. 51-2099 discloses, as a fluorine-containing polymer for electrodeposition coating, an aqueous dispersion obtained by emulsion-polymerizing at least one vinyl monomer in an aqueous dispersion of a fluoropolymer. In Japanese Patent Application Kokoku No. 51-2099, only polytetrafluoroethylene and tetrafluoroethylene-hexafluoropropylene copolymer are actually preferably used as the aqueous dispersion of a fluoropolymer. When aqueous dispersions of these fluoropolymers are used, the vinyl resin is merely attached to particles of the fluoropolymer as if the particles are covered with the vinyl resin, and the present inventors have found that when the above aqueous dispersion is coated and dried, the transparency and mechanical strength of the resulting film are unsatisfactory.

The investigation by the present inventors has revealed that the above approaches do not sufficiently remedy the drawbacks of the fluororesins and problems to be solved still remain in making the fluororesins practicable.

In the case of the powdery composition described in Japanese Patent Application Kokai No. 54-15,077, the polymer obtained has usually a large particle diameter of 50–200 $\mu$m, and hence, the film formed from the powdery composition is inferior in weather resistance and chemical resistance. The aqueous dispersion of a fluorine-containing polymer described in Japanese Patent Application Kokai No. 59-157,159 has low storage stability and the film formed from the dispersion is not sufficient in durability, etc. In the composite material obtained by the process described in Japanese Patent Application Kokai No. 63-312,836, the weather resistance, chemical resistance, etc. which are the characteristic features of the flurororesins are lost because the ethylenically unsaturated carboxylic acid ester and/or the monomer copolymerizable therewith are used in too large an amount relative to the fluorine-containing polymer seed particles.

Therefore, the object of this invention is to overcome the above-mentioned drawbacks of fluororesins while retaining the excellent properties inherent in the fluororesins and to provide an aqueous fluorine-containing polymer dispersion which has excellent storage stability and excellent film formability and which can form a film superior in adhesion to substrate, chemical resistance, mechanical strengths, etc.

The present inventors have found that the above object can be achieved by an aqueous fluorine-containing polymer dispersion having particle sizes falling within the specific range, obtained by emulsion-polymerizing a monomer mixture having a specific composition in an aqueous medium in the presence of seed particles of a vinylidene fluoride polymer.

According to this invention, there is provided an aqueous fluorine-containing polymer dispersion having particle diameters of 0.05–3 $\mu$m, obtained by emulsion-polymerizing 5–95 parts by weight of a monomer mixture consisting of at least one monomer selected from the group consisting of alkyl acrylates whose alkyl groups have 1–18 carbon atoms and alkyl methacrylates whose alkyl groups have 1–18 carbon atoms and optionally an ethylenically unsaturated compound copolymerizable with the alkyl acrylates and the alkyl methacrylates, in an aqueous medium in the presence of 100 parts by weight of particles of a vinylidene fluoride polymer.

This invention further provides an aqueous dispersion comprising a fluorine-containing polymer, which dispersion consists essentially of 95–30 parts by weight (in terms of solids content) of the above aqueous fluorine-containing polymer dispersion and 5–70 parts by weight (in terms of solids content) of an aqueous dispersion of at least one resin selected from the group consisting of a water-soluble resin and a water-dispersible resin.

In this invention, the vinylidene fluoride polymer used as seed particles is preferably a vinylidene fluoride polymer obtained by emulsion-polymerization. Specific examples of the vinylidene fluoride polymer obtained by emulsion-polymerization include vinylidene fluoride homopolymer and copolymers of (1) vinylidene fluoride and (2) a fluorine-containing ethylenically unsaturated compound (e.g. trifluorochloroethylene, tetrafluoroethylene, hexafluoropropylene, vinyl fluoride, hexafluoroisobutylene, perfluoroacrylic acid or the like), a fluorine-free ethylenically unsaturated compounds (e.g. cyclohexyl vinyl ether, hydroxyethyl vinyl ether or the like), a fluorine-free diene compound (e.g. butadiene, isoprene, chloroprene or the like) or the like, all of them being copolymerizable with vinylidene fluoride. Of these, preferred are vinylidene fluoride homopolymer, vinylidene fluoride/tetrafluoroethylene copolymer, vinylidene fluoride/tetrafluoroethylene/hexafluoropropylene copolymer, etc.

The vinylidene fluoride polymer particles may be added in any state to the polymerization system as long as they are dispersed in an aqueous medium in the form of particles. Since the vinylidene fluoride polymer is usually produced as an aqueous dispersion, it is convenient that the aqueous dispersion as produced be used as seed particles. Such an aqueous vinylidene fluoride polymer dispersion can be produced by a conventional emulsion polymerization method, for example, by emulsion-polymerizing the starting monomers in an aqueous medium in the presence of an emulsifier, a polymerization initiator, a pH-adjusting agent, etc. which are all described hereinafter. The particle diameters of the vinylidene fluoride polymer particles may vary depending upon the diameters of polymer particles present in an objective aqueous dispersion of said polymer but ordinarily is in the range of preferably 0.04–2.9 μm.

In this invention, the vinylidene fluoride polymer particles used as seed particles are obtained preferably by emulsion polymerization. When the vinylidene fluoride polymer particles obtained by, for example, conventional suspension-polymerization are used as seed particles, the resulting polymer usually has large particle diameters of 50–200 μm; therefore, when such a polymer is used as it is, the object of this invention cannot be achieved.

The alkyl acrylate with an alkyl group having 1–18 carbon atoms, used as one monomer to be emulsion-polymerized in the presence of the vinylidene fluoride polymer particles, includes, for example, methyl acrylate, ethyl acrylate, propyl acrylate, n-butyl acrylate, isobutyl acrylate, amyl acrylate, isoamyl acrylate, hexyl acrylate, 2-ethylhexyl acrylate, lauryl acrylate and the like. Of these, alkyl acrylates with an alkyl group having 1–8 carbon atoms are preferred, and alkyl acrylates with an alkyl group having 1–5 carbon atoms are more preferable. These compounds may be used alone or in admixture of two or more.

The alkyl methacrylate with an alkyl group having 1–18 carbon atoms, used as the other monomer to be emulsion-polymerized, includes, for example, methyl methacrylate, ethyl methacrylate, propyl methacrylate, n-butyl methacrylate, isobutyl methacrylate, amyl methacrylate, isoamyl methacrylate, hexyl methacrylate, lauryl methacrylate and the like. Of these, alkyl methacrylates with an alkyl group having 1–8 carbon atoms are preferred, and alkyl methacrylates with an alkyl group having 1–5 carbon atoms are more preferable. These compounds may be used alone or in admixture of two or more.

The ethylenically unsaturated compound copolymerizable with the alkyl acrylate and the alkyl methacrylate includes (A) a functional group-containing alkenyl compound and (B) a functional group-free alkenyl compound.

The functional group-containing alkenyl compound (A) includes, for example, $\alpha,\beta$-unsaturated carboxylic acids such as acrylic acid, methacrylic acid, fumaric acid, crotonic acid, itaconic acid and the like; vinyl ester compounds such as vinyl acetate and the like; amide compounds such as acrylamide, methacrylamide, N-methylacrylamide, N-methylmethacrylamide, N-methylolacrylamide, N-methylolmethacrylamide, N-alkylacrylamide, N-alkylmethacrylamide, N,N-dialkylacrylamide, N,N-dialkylmethacrylamide and the like; acrylic acid esters such as 2-hydroxyethyl acrylate, N-dialkylaminoethyl acrylate, glycidyl acrylate, fluoroalkyl acrylate and the like; methacrylic acid esters such as dialkylaminoethyl methacrylate, fluoroalkyl methacrylate, 2-hydroxyethyl methacrylate, glycidyl methacrylate, ethylene glycol dimethacrylate and the like; and alkenyl glycidyl ether compounds such as allyl glycidyl ether and the like. Of these, preferred are acrylic acid, methacrylic acid, itaconic acid, fumaric acid, N-methylolacrylamide, N-methylolmethacrylamide, 2-hydroxyethyl acrylate, 2-hydroxyethyl methacrylate and allyl glycidyl ether. These compounds may be used alone or in admixture of two or more.

The functional group-free alkenyl compound (B) includes, for example, conjugated dienes such as 1,3-butadiene, isoprene and the like; aromatic alkenyl compounds such as styrene, $\alpha$-methylstyrene, styrene halides and the like; divinyl hydrocarbon compounds such as divinyl benzene and the like; and alkenyl cyanides such as acrylonitrile, methacrylonitrile and the like. Of these, preferred are 1,3-butadiene, styrene and acrylonitrile. These compounds may be used alone or in admixture of two or more.

It is preferable that the functional alkenyl compound (A) be used in a proportion of less than 50% by weight based on the weight of the monomer mixture and the functional group-free alkenyl compound (B) be used in a proportion of less than 30% by weight based on the weight of the monomer mixture.

When both the alkyl acrylate and the alkyl methacrylate are used, the proportions of these two esters are not critical and can be appropriately varied depending upon the desired properties of the resulting fluorine-containing polymer. The proportion of the alkyl acrylate in the monomer mixture is preferably less than 80% by weight, particularly preferably less than 60% by weight. When the proportion is 80% by weight or more, the resulting aqueous dispersion gives a film having low chemical resistance, weather resistance, mechanical strengths, etc. When the alkyl acrylate is used in a proportion close to 80% by weight, the alkyl group of the alkyl acrylate preferably has 3 or more carbon atoms in view of the weather resistance.

The aqueous fluorine-containing polymer dispersion according to this invention can be obtained by emulsion-polymerizing 5–95 parts by weight, particularly preferably 20–90 parts by weight, of the monomer mixture mentioned above, in an aqueous medium in the presence of 100 parts by weight of the vinylidene fluoride polymer particles mentioned above.

When the amount of the monomer mixture used is less than 5 parts by weight, the resulting aqueous dispersion is inferior in processability (film formability) and adhesion to substrate. When the amount is more than 95 parts by weight, the weather resistance, chemical resistance, etc. inherent in the vinylidene fluoride polymer are lost in the resulting dispersion.

It is not clear what type of product is obtained in the emulsion-polymerization. However, it is thought that the monomer mixture is mostly absorbed or adsorbed by the vinylidene fluoride polymer particles and polymerized while swelling the particles.

The emulsion-polymerization can be effected under ordinary emulsion polymerization conditions. For example, an emulsifier, a polymerization initiator, a pH-adjusting agent, a solvent, etc. are added to an aqueous medium, and polymerization is effected at a temperature of about 30°–100° C. for about 1–30 hours.

As the emulsifier, there is used an anionic emulsifier, a nonionic emulsifier or a combination thereof. In some cases, there can also be used an amphoteric surfactant or a cationic surfactant. As the anionic emulsifier, there can be used, for example, a sodium salt of a sulfuric acid ester of a higher alcohol, a sodium alkylbenzenesulfonate, a sodium salt of a dialkyl succinate sulfonic acid and a sodium salt of an alkyl diphenyl ether disulfonic acid. Of these, preferable are sodium dodecylbenzenesulfonate, sodium laurylsulfate, a polyoxyethylene alkyl (or alkylphenyl) ether sulfate, etc. As the nonionic emulsifier, there can be used, for example, polyoxyethylene alkyl ether and a polyoxyethylene alkylaryl ether. Preferred are a polyoxyethylene nonylphenyl ether, polyoxyethylene octylphenyl ether, etc. As the amphoteric emulsifier, lauryl betaine, etc. are suitable. As the cationic surfactant, there can be used an alkylpyridinium chloride, an alkylammonium chloride, etc. As the emulsifier, there can also be used so-called reactive emulsifiers copolymerizable with the monomers mentioned above, such as sodium styrenesulfonate, sodium arylalkylsulfonate and the like.

The amount of the emulsifier used is ordinarily about 0.05–5 parts by weight per 100 parts by weight of the total of the vinylidene fluoride polymer particles and the monomer mixture.

As the polymerization initiator, there can be used, for example, a water-soluble persulfonic acid salt and hydrogen peroxide. In some cases, the polymerization initiator can be used in combination with a reducing agent. The reducing agent includes, for example, sodium pyrosulfite, sodium hydrogensulfite, sodium thiosulfate, L-ascorbic acid and its salt, and sodium formaldehyde sulfoxylate. It is also possible to use an oil-soluble polymerization initiator dissolved in the monomer or a solvent. The oil-soluble polymerization initiator includes, for example, 2,2′-azobisisobutyronitrile, 2,2′-azobis-(4-methoxy-2,4-dimethylvaleronitrile), 2,2′-azobis-2,4-dimethylvaleronitrile, 1,1′-azobis-cyclohexane-1-carbonitrile, benzoyl peroxide, dibutyl peroxide, cumene hydroperoxide, isopropylbenzene hydroperoxide, p-menthane hydroperoxide, t-butyl hydroperoxide, 3,5,5-trimethylhexanol peroxide, t-butyl peroxy-(2-ethylhexanoate), etc. Preferred are cumene hydroperoxide, isopropylbenzene hydroperoxide, p-menthane hydroperoxide, 2,2′-azobisisobutyronitrile, benzoyl peroxide, t-butyl hydroperoxide, 3,5,5-trimethylhexanol peroxide and t-butyl peroxy-(2-ethylhexanoate). The amount of the polymerization initiator used is about 0.1–3 parts by weight per 100 parts by weight of the monomer mixture.

The chain transfer agent includes, for example, halogenated hydrocarbons (e.g. carbon tetrachloride, chloroform, bromoform and the like), mercaptans (e.g. n-dodecylmercaptan, t-dodecylmercaptan, n-octylmercaptan and the like), xanthogens (e.g. dimethylxanthogen disulfide, diisopropyl xanthogen disulfide and the like), and terpenes (e.g. dipentene, terpinolene and the like). The amount of the chain transfer agent used is about 0–10 parts by weight per 100 parts by weight of the monomer mixture.

The chelating agent includes, for example, glycine, alanine and ethylenediaminetetraacetic acid, and the pH-adjusting agent includes, for example, sodium carbonate, potassium carbonate and sodium hydrogencarbonate. The amounts of the chelating agent and the pH-adjusting agent used are about 0–0.1 part by weight and about 0–3 parts by weight per 100 parts by weight of the monomer mixture, respectively.

As the solvent, there may be used, for example, methyl ethyl ketone, acetone, trichlorofluoroethane, methyl isobutyl ketone, dimethyl sulfoxide, toluene, dibutyl phthalate, methylpyrrolidone, ethyl acetate and the like in such a small amount that the workability, safety against fire hazard, environmental safety and production safety are not impaired. The amount of the solvent used is about 0–20 parts by weight per 100 parts by weight of the monomer mixture.

The emulsion-polymerization using the vinylidene fluoride polymer particles as seed particles can be effected according to a known method, for example, a method wherein the whole amount of the monomers is fed into the reaction system at one time in the presence of vinylidene fluoride polymer particles, a method wherein part of the monomers are fed and reacted and then the rest of the monomers is fed continuously or in portions, a method wherein the whole amount of the monomers is fed continuously, or a method wherein the vinylidene fluoride polymer particles are added in portions or continuously while allowing the monomers to react.

The average particle diameter of the fluorine-containing polymer in the aqueous dispersion of said polymer according to this invention is 0.05–3 $\mu$m, preferably 0.05–1 $\mu$m, more preferably 0.1–1 $\mu$m. When the average particle diameter is less than 0.05 $\mu$m, the resulting aqueous dispersion has a high viscosity; accordingly it is impossible to obtain an aqueous dispersion of a high solid content, and a coagulation product is formed when the mechanical shear conditions are severe depending upon the use conditions. When the average particle diameter is more than 3 $\mu$m, the aqueous dispersion has poor storage stability.

The average particle diameter of the fluorine-containing polymer can be controlled by appropriately selecting the size of the starting vinylidene fluoride polymer particles.

In this invention, the z-average particle diameters of the fluorine-containing polymer were determined using Nano-Sizer manufactured by Coulter Electronics Instrument.

The aqueous dispersion containing the above fluorine-containing polymer and a water-soluble resin and/or a water-dispersible resin according to this invention can be obtained by blending 5–70 parts by weight, preferably 10–50 parts by weight (in terms of solids content) of an aqueous dispersion of a water-soluble resin and/or a water-dispersible resin with 95–30 parts by weight, preferably 90–50 parts by weight (in terms of solids content) of the above mentioned aqueous fluorine-containing polymer dispersion [the total of the two aqueous dispersions is 100 parts by weight (in terms of solids content)].

When the proportion of the aqueous fluorine-containing polymer dispersion is more than 95 parts by weight (in terms of solids content), the film formed by the resulting aqueous dispersion containing a fluorine-containing polymer and a water-soluble resin and/or a water-dispersible resin is low in durability, etc. When the proportion is less than 30 parts by weight, the film is low in chemical resistance, etc.

The water-soluble resin may be any resin which is generally known to be water-soluble. Typical water-soluble resins include N-methylolmelamine resins, alkylated N-methylolmelamine resins, water-soluble acrylic resins, urethane resins, epoxy resins, polyester resins, water-soluble nylon resins, alkyd resins, urea resins, maleinized polybutadiene, maleinized oils, and the like. Of these, preferred are an N-methylolmelamine resin, an alkylated N-methylolmelamine resin and a water-soluble acrylic resin.

The water-dispersible resin generally refers to a resin capable of forming an emulsion. The emulsion specifically includes a (meth)acrylic emulsion, a vinyl acetate emulsion, an ethylene-vinyl acetate emulsion, a urethane emulsion and the like. Of these, a (meth)acrylic emulsion is preferable. When the water-dispersible resin is used in the emulsion form, the amount of the emulsion used is determined so that the solids content thereof is in the range mentioned above.

When the water-soluble resin and the water-dispersible resin are used in combination, the ratio of the two (water-soluble resin/water-dispersible resin) is preferably controlled in the range of 20/80–80/20 (weight ratio).

In preparing an aqueous dispersion containing a fluorine-containing polymer and a water-soluble resin and/or a water-dispersible resin according to this invention, the water-soluble resin is added as it is to the aqueous fluorine-containing polymer dispersion and the resulting mixture is stirred using a proper means, for example, a stirrer, upon which an aqueous dispersion in which the water-soluble resin is uniformly dissolved can be obtained. It is also possible that the water-soluble resin be dissolved in water and the resulting aqueous solution be added. The water-dispersible resin is generally added in the emulsion form. As in the case of the water-soluble resin, a uniform aqueous dispersion can be obtained by stirring a mixture of the water-dispersible resin and the fluorine-containing polymer dispersion by means of, for example, a stirrer.

Though the aqueous dispersion containing a fluorine-containing polymer and a water-soluble resin and/or a water-dispersible resin can be used as it is, it may be mixed with additives such as a pigment, a dispersant for pigment, a filler, an antioxidant and the like and then used.

Both the aqueous fluorine-containing polymer dispersion and the aqueous dispersion containing a fluorine-containing polymer and a water-soluble resin and/or a water-dispersible resin have excellent film formability and can be formed into a film superior in weather resistance, transparency, chemical resistance, adhesion to substrate, mechanical strengths, etc. Therefore, they can be used as a coating composition of the baking type or the room-temperature drying type, a cationic electropaint, a fiber-treating compound, a paper-processing compound, a floor-coating compound, a carpet-backing compound, a packing compound, a non-tackiness imparting compound, a sealing compound, a laminating compound, a lining compound, a corrosion-preventive compound, an impregnating compound, a laminate film, a water-repellence-treating compound, an oil-repellence-treating compound, etc. For example, the aqueous fluorine-containing polymer dispersion is coated on a substrate and baked at 100°–200° C. for about 1–30 minutes, whereby a film superior in durability, chemical resistance and weather resistance can be obtained. The aqueous dispersion containing a fluorine-containing polymer and a water-soluble resin and/or a water-dispersible resin is particularly superior in storage stability and accordingly is very advantageous in storage and transportation.

This invention is explained in more detail below referring to Examples. In the Examples, part and % are by weight, unless otherwise specified.

EXAMPLE 1

Preparation of aqueous fluorine-containing polymer dispersion

A stainless steel autoclave equipped with a stirrer, a thermometer and a monomer-feeding pump was fitted with a heater and a nitrogen-blowing device. Thereinto were charged 100 parts of water, 100 parts (in terms of solids content) of an aqueous vinylidene fluoride polymer dispersion [an uncoagulated latex of a vinylidene fluoride/tetrafluoroethylene/hexafluoropropylene copolymer (KYNAR 9301, trade name of Pennwalt Corp.) having an average particle diameter of 0.25 $\mu$m, and 0.3 part of sodium persulfate]. The gas phase in the autoclave was replaced with a nitrogen gas for 15 minutes, and the temperature of the mixture was elevated to 75° C.

Then, an emulsion separately obtained by emulsion-mixing 15 parts of n-butyl acrylate, 23 parts of methyl methacrylate, 2 parts of methacrylic acid, 50 parts of water and 0.2 part of a sodium alkylbenzenesulfonate as an emulsifier was continuously charged into the autoclave over 3 hours. After the completion of the charging, the mixture was aged for a further 2 hours at 85°–95° C., cooled, adjusted to pH 8 with ammonia water, then filtered through a 200-mesh (Tyler) wire net to obtain an aqueous fluorine-containing polymer dispersion.

The polymer particles in the aqueous dispersion had an average particle diameter of 0.27 $\mu$m.

The average particle diameter of the polymer particles was determined using Nano-Sizer.

The minimum film-forming temperature (MFT) of the aqueous dispersion was measured using a heat gradient tester manufactured by Rigaku Kogyo K.K. (The lower the MFT, the better the film formability.)

The aqueous dispersion was poured into a glass frame-equipped container [150 cm $\times$ 10 cm $\times$ 0.2 cm (depth)] so that the film thickness after drying became 0.06 cm, and dried at 50° C. for 24 hours. The resulting film was punched using a dumbbell-like No. 2 die to prepare test pieces. Using the test pieces, tensile strength, elongation at break and 100% modulus were measured in accordance with JIS K 6301. As a result, the tensile strength was 70 kg/cm$^2$, the elongation at break was 350%, and the 100% modulus was 45 kg/cm$^2$.

The transparency of the film was observed visually and evaluated according to the following criteria:

○: Transparent
Δ: Slightly opaque
X: Opaque

The crack formation in the film was examined visually.

The results obtained are shown in Table 1.

Comparative Example 1

The same aqueous vinylidene fluoride polymer dispersion as in Example 1 was as such subjected to the same tests as in Example 1.

The results obtained are shown in Table 1.

It is appreciated from Table 1 that the aqueous vinylidene fluoride polymer dispersion is inferior to the aqueous fluorine-containing polymer dispersion of this invention.

Comparative Example 2

The same procedure as in Example 1 was repeated, except that the aqueous vinylidene fluoride polymer dispersion was not used, to obtain an aqueous dispersion. The aqueous dispersion was adjusted to pH 8 with ammonia water and then filtered through a 200-mesh (Tyler) wire net. The polymer particles in the aqueous dispersion had an average particle diameter of 0.27 μm.

40 parts (in terms of solids content) of the above aqueous dispersion was mixed with 100 parts (in terms of solids content) of the same aqueous vinylidene fluoride polymer dispersion as in Example 1. The resulting aqueous dispersion was subjected to the same tests as in Example 1.

The results obtained are shown in Table 1.

It is appreciated from Table 1 that the mere mixing of the aqueous polymer dispersion prepared without using the seed particles with the aqueous vinylidene fluoride polymer dispersion cannot give good results.

Comparative Example 3

The same procedure as in Example 1 was repeated, except that the aqueous vinylidene fluoride polymer dispersion was replaced with an aqueous tetrafluoroethylene homopolymer dispersion (average particle diameter: 0.25 μm), to prepare an aqueous fluorine-containing polymer dispersion (average particle diameter: 0.27 μm). The aqueous dispersion was subjected to the same tests as in Example 1.

The results obtained are shown in Table 1.

It is appreciated from Table 1 that the use of a fluorine-containing polymer other than the vinylidene fluoride polymer gives poor film transparency and cannot achieve the object of this invention.

TABLE 1

|  | Example 1 | Comparative Example 1 | Comparative Example 2 | Comparative Example 3 |
| --- | --- | --- | --- | --- |
| Film formability |  |  |  |  |
| Cracks | None | Many*[1] | Many*[1] | None |
| Transparency | ○~Δ | Δ | X | X |
| Minimum film-forming temperature (°C.) | +25 | +80 | +50 | +27 |
| Physical properties |  |  |  |  |
| Tensile strength (kg/cm$^2$) | 70 | 10 | 45 | 60 |
| Elongation at break (%) | 350 | 150 | 250 | 300 |
| 100% modulus (kg/cm$^2$) | 45 | 6 | 30 | 42 |

Note: *[1] No continuous film was formed.

Comparative Example 4

Into a one-liter stainless steel autoclave were charged 600 g of water, 2 g of di-n-propyl peroxycarbonate and 0.6 g of methyl cellulose. After evacuation, 200 g of vinylidene fluoride was charged into the autoclave from a vinylidene fluoride monomer bomb through a pipe. Then, the autoclave was placed in a constant-temperature water bath at 25° C. and the autoclave contents were stirred at 350 rpm, whereby the internal pressure was dropped from 40 kg/cm$^2$ to 18 kg/cm$^2$. The solids content in the autoclave contents was 18%. It was confirmed therefrom by calculation that 130 g of a polyvinylidene fluoride was obtained.

The internal temperature of the autoclave was adjusted to 85°–95° C. and 0.39 g of sodium persulfate was charged thereinto. A mixture consisting of 19.5 parts of n-butyl acrylate, 29.9 g of methyl methacrylate and 2.6 g of methacrylic acid obtained separately (the respective amounts correspond to 15 parts, 23 parts and 2 parts, respectively, per 100 parts of the polyvinylidene fluoride) was continuously charged thereinto over 3 hours. After the completion of the addition, the resulting mixture was aged for a further 2 hours at 85°–95° C., cooled and adjusted to pH 8 with ammonia water.

The resulting aqueous dispersion was observed with an optical microscope. The average particle diameter was about 50 μm.

The aqueous dispersion obtained was evaluated in the same manner as in Example 1 and Example 9 to obtain the following results:

| Film formability |  |
| --- | --- |
| Cracks: | Many (no continuous film was obtained.) |
| Transparency: | Δ |
| Minimum film-forming temperature (°C.): | 120 |
| Physicals properties |  |
| Tensile strength (kg/cm$^2$): | 15 |
| Elongation at break (%): | 100 |
| 100% Modulus (kg/cm$^2$): | 7 |
| Coating film performance |  |
| Weather resistance: | Δ |
| Adhesion: | X |
| Alkali resistance: | Slightly swollen |
| Gasoline resistance: | Slightly swollen |
| Acid resistance | Slightly swollen |

From the above results, it can be seen that when polyvinylidene fluoride particles obtained by suspension polymerization were used as seed particles, the aqueous fluorine-containing polymer dispersion of this invention could not be obtained.

EXAMPLES 2-8

The same procedure as in Example 1 was repeated, except that the types and amounts of monomers charged were changed as shown in Table 2, to prepare aqueous fluorine-containing polymer dispersions. The dispersions were subjected to the same tests as in Example 1.

The results obtained are shown in Table 3. The results of Example 1 are also shown for comparison.

The average particle diameters of the aqueous fluorine-containing polymer dispersions obtained are shown in Table 2.

became 60%. To the resulting mixture was added, as a thickening agent, hydroxyethyl cellulose [A-5000, a trade name of Fuji Chemical Co., Ltd.] so that the paint viscosity became 4000 cps. Thorough mixing was effected by a disperser, and the resulting mixture was transferred to a vacuum defoaming device, in which the mixture was defoamed.

The coating composition thus obtained was coated on an iron plate (JIS G 3141, SPCC-SB plate, 0.8 mm×70 mm×150 mm) degreased with xylene and an alkaline cleaning solution, using an air spray gun so that the coating film after drying had a thickness of 200 μm. The coated iron plate was dried at 150° C. for 15 minutes.

The resulting coated iron plate was subjected to the following tests:

(1) Weather resistance

The coated iron plate was placed in a fademeter manufactured by Suga Shikenki K.K. for 1,000 hours. Then,

TABLE 2

|  | Example 2 | Example 3 | Example 4 | Example 5 | Example 6 | Example 7 | Example 8 |
|---|---|---|---|---|---|---|---|
| Monomer (parts) | | | | | | | |
| n-Butyl acrylate | — | 25 | — | 3.0 | 33.2 | — | — |
| Methyl methacrylate | 40 | — | 25 | 8.5 | 49.4 | 20 | 20 |
| Methacrylic acid | — | — | 5 | — | — | — | — |
| Acrylic acid | — | — | — | 0.5 | 0.5 | 2 | 2 |
| Itaconic acid | — | — | — | — | 0.5 | — | — |
| Allyl glycidyl ether | — | — | — | 3.0 | — | — | — |
| N-methylolmethacrylamide | — | — | — | — | 1.9 | — | — |
| n-Butyl methacrylate | — | — | — | — | 9.5 | — | — |
| Styrene | — | 15 | — | — | — | — | — |
| Acrylonitrile | — | — | 5 | — | — | — | — |
| Butadiene | — | — | 5 | — | — | — | — |
| Methyl acrylate | — | — | — | — | — | 18 | — |
| Ethyl acrylate | — | — | — | — | — | — | 18 |
| Monomer total (parts) | 40 | 40 | 40 | 15 | 95.0 | 40 | 40 |
| Vinylidene fluoride polymer (parts) | 100 | 100 | 100 | 100 | 100 | 100 | 100 |
| Average particle diameter of poolymer (μm) | 0.28 | 0.27 | 0.28 | 0.26 | 0.33 | 0.27 | 0.27 |

TABLE 3

|  | Example 1 | Example 2 | Example 3 | Example 4 | Example 5 | Example 6 | Example 7 | Example 8 |
|---|---|---|---|---|---|---|---|---|
| Film formability | | | | | | | | |
| Cracks | None | Slight | None | Slight | None | None | None | None |
| Transparency | ○~Δ | ○ | Δ | Δ | ○~Δ | ○~Δ | ○ | ○ |
| Minimum film-forming temperature (°C.) | +25 | +50 | +2 | +24 | +28 | +20 | +35 | +30 |
| Physical properties | | | | | | | | |
| Tensile strength (kg/cm$^2$) | 70 | 125 | 58 | 158 | 65 | 110 | 95 | 90 |
| Elongation at break (%) | 350 | 200 | 1800 | 200 | 200 | 250 | 260 | 280 |
| 100% modulus (kg/cm$^2$) | 45 | 105 | 36 | 114 | 50 | 75 | 65 | 55 |

EXAMPLE 9

With 100 parts (in terms of solids content) of the aqueous fluorine-containing polymer dispersion obtained in Example 1 was mixed 50 parts of titanium oxide as a filler [Tipaque R930, a trade name of ISHIHARA SANGYO KAISHA, LTD.], 2 parts of a poly(-sodium carboxylate) as a dispersant [SN-DISPERSANT 5044, a trade name of SAN NOPCO LIMITED], 1 part of ethylene glycol as an anti-freeze agent, 0.05 part of an antiseptic [SN-215, a trade name of SAN NOPCO LIMITED], 0.5 part of an antifoamer [FOAM ASTER-AP, a trade name of SAN NOPCO LIMITD] and 2 parts of 2-amino-2-methyl-1-propanol. The mixture was diluted with water so that the solids content the coated iron plate was measured for gloss, and the retention of gloss (%) as compared with the initial gloss was calculated. The weather resistance of the coating film on the iron plate was evaluated according to the following criteria:

| Weather resistance | Retention of gloss (%) |
|---|---|
| ○ | 100–80 |
| Δ | 79 |
| X | 39 or less |

(2) Adhesion

The coating film surface of the coated iron plate was subjected to crosscutting to form 100 square portions each of 2 mm×2 mm. These portions were subjected to a peeling test using a pressure-sensitive tape manufactured by Nichiban Co., Ltd. The adhesion of the coating film was evaluated according to the following criteria:

| Adhesion | Number of remaining aquares |
|---|---|
| ○ | 100–80 |
| Δ | 79–40 |
| X | 39 or less |

(3) Alkali resistance

The alkali resistance of the coating film on the iron plate was tested according to JIS K 5400 using a 5% sodium carbonate solution (40° C.±2° C., 24 hours).

(4) Gasoline resistance

The gasoline resistance of the coating film on the iron plate was tested according to JIS K 5400 using No. 2 gasoline.

(5) Acid resistance

The acid resistance of the coating film on the iron plate was tested according to JIS K 5400 using a 1% sulfuric acid solution (20° C.±1° C., 8 hours).

The results obtained are shown in Table 4.

The aqueous dispersions obtained in Examples 7 and 8 were also evaluated in the same manner as above. The results obtained are shown in Table 4.

Comparative Examples 5–7

The same procedure as in Example 9 was repeated, except that the aqueous fluorine-containing polymer dispersion used in Example 9 was replaced with the aqueous fluorine-containing polymer dispersion of Comparative Example 1 (Comparative Example 5), the mixed aqueous dispersion of Comparative Example 2 (Comparative Example 6) and the aqueous tetrafluroethylene homopolymer dispersion of Comparative Example 3 (Comparative Example 7), to obtain coating compositions. The coating compositions were subjected to the same tests as in Example 9.

The results obtained are shown in Table 4.

It is appreciated from Table 4 that none of the above coating compositions can achieve the object of this invention.

EXAMPLES 10–11

The same procedure as in Example 9 was repeated, except that the aqueous vinylidene fluoride polymer dispersion used in Example 9 was replaced with a latex of a vinylidene fluoride homopolymer [KYNAR 500, a trade name of Pennwalt Corp.] (Example 10) and a latex of a vinylidene fluoride/tetrafluoroethylene copolymer [KYNAR 7201, a trade name of Pennwalt Corp.] (Example 11), to obtain coating compositions. The coating compositions were subjected to the same tests as in Example 9. Each polymer in the coating compositions had an average particle diameter of 0.27 μm.

The results obtained are shown in Table 4.

The aqueous fluorine-containing polymer dispersion prepared in Example 10 was evaluated in the same manner as in Example 1 to obtain the following results:

| Film-formability | |
|---|---|
| Cracks: | Slight |
| Transparency: | ○~Δ |
| MFT (°C.): | 100 |
| Tensile strength (kg/cm$^2$): | 70 |
| Elongation at break (%): | 250 |
| 100% Modulus (kg/cm$^2$): | 50 |

TABLE 4

| | Example 7 | Example 8 | Example 9 | Comparative Example 5 | Comparative Example 6 | Comparative Example 7 | Example 10 | Example 11 |
|---|---|---|---|---|---|---|---|---|
| Weather resistance | ○ | ○ | ○ | ○ | ○ | ○ | ○ | ○ |
| Adhesion | ○ | ○ | ○ | X | Δ | ○ | ○ | ○ |
| Alkali resistance | No change | No change | No change | No change | Slightly swollen | Slightly swollen | No change | No change |
| Gasoline resistance | No change | No change | No change | No change | Slightly peeled | Slightly swollen | No change | No change |
| Acid resistance | No change | No change | No change | No change | Slightly swollen | Slightly swollen | No change | No change |

Comparative Examples 8–11

The same procedure as in Example 1 was repeated, except that the types and amounts of the monomers charged were varied as shown in Table 5, to obtain aqueous dispersions. Then, the same procedure as in Example 9 was repeated using the aqueous dispersions thus obtained to prepare coating compositions. The properties of the coating compositions were evaluated in the same manner as in Example 9.

The results obtained are shown in Table 6.

It is appreciated from Table 6 that when the total amount of the monomers is less than 5 parts per 100 parts of the vinylidene fluoride polymer particles, the resulting coating composition gives poor adhesion and, when the total amount is more than 95 parts, the coating composition is inferior in weather resistance and chemical resistance.

TABLE 5

| | Comparative Example 8 | Comparative Example 9 | Comparative Example 10 | Comparative Example 11 |
|---|---|---|---|---|
| Monomer (parts) | | | | |
| n-Butyl acrylate | 1.8 | 46.0 | — | — |
| Methyl methacrylate | 1.0 | 71.6 | 5.0 | — |

TABLE 5-continued

|  | Comparative Example 8 | Comparative Example 9 | Comparative Example 10 | Comparative Example 11 |
| --- | --- | --- | --- | --- |
| Methacrylic acid | 0.2 | 2.4 | 5.0 | — |
| Methyl acrylate | — | — | 40 | 100 |
| Ethyl acrylate | — | — | 50 | — |
| Monomer total (parts) | 3 | 120 | 100 | 100 |
| Vinylidene fluoride polymer (parts) | 100 | 100 | 100 | 100 |
| Average particle diameter of polymer (μm) | 0.25 | 0.35 | 0.33 | 0.34 |

TABLE 6

|  | Comparative Example 8 | Comparative Example 9 | Comparative Example 10 | Comparative Example 11 |
| --- | --- | --- | --- | --- |
| Weather resistance | ○ | Δ | Δ | Δ |
| Adhesion | Δ | ○ | ○ | ○ |
| Alkali resistance | No change | Swollen | Swollen and peeled | Swollen and peeled |
| Gasoline resistance | No change | Peeled | Slightly swollen | Slightly swollen |
| Acid resistance | No change | Slightly swollen | Slightly swollen | Swollen |

EXAMPLE 12

Preparation of aqueous fluorine-containing polymer dispersion

Into the same autoclave as in Example 1 were charged 170 parts of water, 100 parts (in terms of solids content) of the same aqueous vinylidene fluoride polymer dispersion as in Example 1 and 0.3 part of sodium persulfate. The gas phase portion of the autoclave was replaced with a nitrogen gas for 15 minutes, and the temperature of the mixture was elevated to 75° C.

Into this autoclave was continuously charged over 5 hours an emulsion separately obtained by mixing 43 parts of n-butyl acrylate, 47 parts of methyl methacrylate, 5 parts of methacrylic acid, 50 parts of water and 0.7 part of a sodium alkylbenzenesulfonate as an emulsifier. After the completion of the charging, the mixture was aged at 85°–95° C. for a further 2 hours, cooled, adjusted to pH 8 with ammonia water and filtered through 200-mesh (Tyler) wire net to obtain an aqueous fluorine-containing polymer dispersion.

The average particle diameter of the polymer particles in the aqueous dispersion was measured using the same tester as in Example 1, to find that it was 0.29 μm.

Preparation of aqueous dispersion containing a fluorine-containing polymer and a water-soluble resin 80 parts (in terms of solids content) of the above aqueous fluorine-containing polymer dispersion was mixed with 20 parts (in terms of solids content) of N-methylolmelamine [M-3, a trade name of SUMITOMO 3M LIMITED], and the mixture was stirred to obtain an aqueous dispersion containing a fluorine-containing polymer and the water-soluble resin.

The aqueous dispersion obtained was measured for storage stability according to the following method, to obtain the results shown in Table 8.

Storage stability

The above aqueous dispersion containing a fluorine-containing polymer and a water-soluble resin was allowed to stand at room temperature to visually examine precipitation or separation. The storage stability of the aqueous dispersion was evaluated according to the following criteria:

○: No change for two months
Δ: No change for one month
×: Precipitation and separation occurred in one month.

In order to evaluate the properties of the coating film obtained with the above aqueous dispersion containing a fluorine-containing polymer and a water-soluble resin, a coating composition was prepared from the aqueous dispersion.

Preparation of coating composition and coating film

To 100 parts (in terms of solids content) of the above aqueous dispersion containing a fluorine-containing polymer and a water-soluble resin were added the same filler, dispersant, anti-freeze agent, antifoamer and 2-amino-2-methyl-1-propanol as used in Example 9, in the same respective amounts as used in Example 9. Water was added thereto to adjust the solids content to 50%. Then, the same thickening agent as used in Example 9 was added to obtain a paint viscosity of 2000 cps. Thorough stirring was effected using a Disper stirrer. Then, the mixture was transferred to a vacuum defoaming device in which the mixture was defoamed.

The coating composition thus obtained was coated on the same iron plate degreased with xylene and an alkaline cleaning solution, as in Example 9, using an air spray gun so that the coating film thickness after drying became 100 μm. The coated iron plate was dried at 150° C. for 15 minutes.

The resulting coated iron plate was subjected to the following tests, to obtain the results shown in Table 8.

Durability

On the coating film on the iron plate, nuts (M-6) of various weights were allowed to fall through a polyvinyl chloride pipe from a height of 2 m at an angle of 60°, and the weight of the nut was examined when the coating film was broken and the iron surface was exposed. The durability of the coating film was evaluated according to the following criteria:

○: 39 kg or more
Δ: 11–39 kg

Pencil hardness

The pencil hardness of the coating film on the iron plate was measured in accordance with JIS K 5400, 6-14.

Alkali resistance

The alkali resistance of the coating film on the iron plate was measured in accordance with JIS K 5400 using a 5% aqueous sodium carbonate (40°±2° C., 6 hours).

Gasoline resistance

The gasoline resistance of the coating film on the iron plate was measured in accordance with JIS K 5400 using No. 2 gasoline.

Comparative Example 12

The same aqueous vinylidene fluoride polymer dispersion as used in Example 12 as seed particles was mixed with N-methylolmelamine in the same manner as in Example 12 to prepare an aqueous dispersion containing a fluorine-containing polymer and a water-soluble resin.

The storage stability of the aqueous dispersion was evaluated in the same manner as in Example 12. Further, a coating composition was prepared using the above aqueous dispersion and measured for the properties of the coating film produced therefrom, in the same manner as in Example 12.

The results obtained are shown in Table 8.

It is appreciated from Table 8 that when the aqueous dispersion of the seed particles (vinylidene fluoride polymer) per se is used in place of the aqueous fluorine-containing polymer dispersion obtained by seed polymerization using said seed particles, the resulting aqueous dispersion containing a fluorine-containing polymer and a water-soluble resin has poor storage stability and low film durability.

EXAMPLE 13

The same procedure as in Example 12 was repeated, except that the N-methylolmelamine used in Example 12 was replaced with a self-crosslinking type acrylic emulsion [AE-815, a trade name of Japan Synthetic Rubber Co., Ltd.], to prepare an aqueous dispersion containing a fluorine-containing polymer and a water-dispersible resin and then a coating composition comprising said aqueous dispersion. In the same manner as in Example 12, the aqueous dispersion was measured for storage stability and the coating composition was measured for film properties.

The results obtained are shown in Table 8.

EXAMPLES 14-16

The same procedure as in Example 12 was repeated, except that the types and amounts of monomers charged and the amount of the aqueous vinylidene fluoride polymer dispersion used as seed particles were varied as shown in Table 7, to prepare aqueous dispersions each containing a fluorine-containing polymer and a water-soluble or -dispersible resin and then coating compositions comprising said aqueous dispersions. Each aqueous dispersion was measured for storage stability, and each coating composition was measured for film properties.

The results obtained are shown in Table 8.

Comparative Examples 13-14

The same procedure as in Example 12 was repeated, except that the amount of N-methylolmelamine used was varied as shown in Table 7, to prepare aqueous dispersions containing a fluorine-containing polymer and a water-soluble resin and then coating composition comprising said aqueous dispersions. Each aqueous dispersion was measured for storage stability and each coating composition was measured for film properties.

The results obtained are shown in Table 8.

It is appreciated from Table 8 that when the amount of N-methylolmelamine used is outside the range specified in this invention, the resulting coating composition gives a coating film inferior in durability and hardness or in alkali resistance.

Comparative Examples 15-16

The same procedure as in Example 12 was repeated, except that the types and amounts of monomers used and the amount of the aqueous vinylidene fluoride polymer dispersion used as seed particles in Example 12 were varied as shown in Table 7, to prepare aqueous dispersions containing a fluorine-containing polymer and a water-soluble resin and then coating compositions comprising said aqueous dispersions. Each aqueous dispersion was measured for storage stability and each coating composition was measured for film properties.

The results obtained are shown in Table 8.

It is appreciated from Table 8 that when the amount of the vinylidene fluoride polymer particles used is outside the range specified in this invention, the resulting coating composition gives a coating film inferior in durability or in gasoline resistance and alkali resistance.

Comparative Examples 17-18

The same procedure as in Example 12 was repeated, except that the vinylidene fluoride polymer particles used as seed particles in Example 12 were replaced with tetrafluoroethylene polymer particles [AD-1, a trade name of Asahi Glass Co., Ltd.] (Comparative Example 17) and tetrafluoroethylene/hexafluoropropylene copolymer particles [ND-1, a trade name of DAIKIN INDUSTRIES, LTD.] (Comparative Example 18), to prepare aqueous dispersions containing a fluorine-containing polymer and a water-soluble resin and then coating compositions comprising said aqueous dispersions. Each aqueous dispersion was measured for storage stability and each coating composition was measured for film properties.

The results obtained are shown in Table 8.

It is appreciated from Table 8 that when the fluorine-containing polymer particles other than the vinylidene fluoride polymer particles are used as seed particles, the resulting coating composition gives a coating film inferior in gasoline resistance and alkali resistance.

TABLE 7

|  | Example | | | | | Comparative Example | | | | | | |
| --- | --- | --- | --- | --- | --- | --- | --- | --- | --- | --- | --- | --- |
|  | 12 | 13 | 14 | 15 | 16 | 12 | 13 | 14 | 15 | 16 | 17 | 18 |
| Starting monomer (parts) | | | | | | | | | | | | |

TABLE 7-continued

|  | Example | | | | | Comparative Example | | | | | | |
| --- | --- | --- | --- | --- | --- | --- | --- | --- | --- | --- | --- | --- |
|  | 12 | 13 | 14 | 15 | 16 | 12 | 13 | 14 | 15 | 16 | 17 | 18 |
| n-Butyl acrylate | 43 | 43 | 16 | 47 | 43 | — | 43 | 43 | 1.6 | 585 | 43 | 43 |
| Methyl methacrylate | 47 | 47 | 16 | 27 | 36 | — | 47 | 47 | 1.2 | 540 | 47 | 47 |
| Methacrylic acid | 5 | 5 | — | — | 5 | — | 5 | 5 | — | 64 | 5 | 5 |
| Acrylic acid | — | — | 1.5 | 1 | 0.8 | — | — | — | 0.4 | — | — | — |
| Itaconic acid | — | — | 0.5 | 1 | — | — | — | — | — | 1 | — | — |
| Allyl glycidyl ether | — | — | 2 | 3 | — | — | — | — | — | 10 | — | — |
| Styrene | — | — | 4 | 16 | 10 | — | — | — | 0.8 | 100 | — | — |
| Monomer total (parts) | 95 | 95 | 40 | 95 | 94.8 | — | 95 | 95 | 4 | 1300 | 95 | 95 |
| Type of water-soluble resin or water-dispersible resin | *2 HMM | *3 AE 815 | *2 HMM | *2 HMM | *2 HMM | *2 HMM | *2 HMM | *2 HMM | *2 HMM | *2 HMM | *2 HMM | *2 HMM |
| (A)/(B)*1 | 80/20 | 80/20 | 80/20 | 85/15 | 60/40 | 80/20 | 98/2 | 15/85 | 60/40 | 85/15 | 80/20 | 80/20 |

Note:
*1 Aqueous fluorine-containing polymer dispersion (A) (in terms of solids content)/water-soluble resin or water-dispersible resin (compounding ratio)
*2 Abbreviation of hexamethylolmelamine
*3 Trade name of Japan Synthetic Rubber Co., Ltd. for acrylic emulsion (self-crosslinking type)

TABLE 8

|  | Example | | | | | Comparative Example | | | | | | |
| --- | --- | --- | --- | --- | --- | --- | --- | --- | --- | --- | --- | --- |
|  | 12 | 13 | 14 | 15 | 16 | 12 | 13 | 14 | 15 | 16 | 17 | 18 |
| Storage stability of aqueous dispersion | ◯ | ◯ | ◯ | ◯ | ◯ | X | ◯ | ◯ | Δ | ◯ | ◯ | ◯ |
| Film properties |  |  |  |  |  |  |  |  |  |  |  |  |
| Durability | ◯ | ◯ | ◯ | ◯ | ◯ | X | X | Δ | X | ◯ | ◯ | ◯ |
| Pencil hardness | 2H | 2H | 3H | 2H | 2H | 2H | HB | 2H | 2H | HB | 2H | 2H |
| Alkali resistance | No Change | No Change | No Change | No Change | No Change | No Change | No Change | Swollen | No Change | Slightly swollen | Swollen | Swollen |
| Gasline resistance | No Change | No Change | No Change | No Change | No Change | No Change | No Change | No Change | No Change | Swollen | Slightly Swollen | Slightly Swollen |

What is claimed is:

1. An aqueous fluorine-containing polymer dispersion having average particle diameters of 0.05–3 μm, which is obtained by emulsion-polymerizing 5–95 parts by weight of a monomer mixture of at least one monomer selected from the group consisting of alkyl acrylates whose alkyl groups have 1–8 carbon atoms and alkyl methacrylates whose alkyl groups have 1–8 carbon atoms in an aqueous medium in the presence of 100 parts by weight of particles of a vinylidene fluoride polymer, said monomer mixture being absorbed into the vinylidene fluoride polymer particles and the proportion of the alkyl acrylate in the monomer mixture being less than 80% by weight, wherein the vinylidene fluoride polymer is obtained by emulsion polymerization and is a vinylidene fluoride/tetrafluoroethylene copolymer or a vinylidene fluoride/tetrafluoroethylene/hexafluoropropylene copolymer.

2. The aqueous fluorine-containing polymer dispersion according to claim 1, wherein the particle diameters of the vinylidene fluoride polymer are in the range of 0.04–2.9 μm.

3. The aqueous fluorine-containing polymer dispersion according to claim 1, wherein the alkyl acrylates include methyl acrylate, ethyl acrylate, propyl acrylate, n-butyl acrylate, isobutyl acrylate, amyl acrylate, isoamyl acrylate, hexyl acrylate, 2-ethylhexyl acrylate and lauryl acrylate, and the alkyl methacrylates include methyl methacrylate, ethyl methacrylate, propyl methacrylate, n-butyl methacrylate, isobutyl methacrylate, amyl methacrylate, isoamyl methacrylate, hexyl methacrylate and lauryl methacrylate.

4. The aqueous fluorine-containing polymer dispersion according to claim 1, wherein the alkyl groups of the alkyl acrylates and the alkyl methacrylates have 1–5 carbon atoms.

5. The aqueous fluorine-containing polymer dispersion according to claim 1, wherein the ethylenically unsaturated compound is selected from the group consisting of a functional group-containing alkenyl compound and a functional group-free alkenyl compound.

6. The aqueous fluorine-containing polymer dispersion according to claim 5, wherein the functional group-containing alkenyl compound is selected from the group consisting of an $\alpha,\beta$-unsaturated carboxylic acid, a vinyl ester of a saturated carboxylic acid, an amide compound, an acrylic acid ester, a methacrylic acid ester and an alkenyl glycidyl ether.

7. The aqueous fluorine-containing polymer dispersion according to claim 6, wherein the $\alpha,\beta$-unsaturated carboxylic acid includes acrylic acid, methacrylic acid, fumaric acid, crotonic acid and itaconic acid; the vinyl ester of a saturated carboxylic acid includes vinyl acetate; the amide compound includes acrylamide, methacrylamide, N-methylacrylamide, N-methylmethacrylamide, N-methylolacrylamide, N-methylolmethacrylamide, an N-alkylacrylamide, an N-alkylmethacrylamide, an N,N-dialkylacrylamide and an N,N-dialkylmethacrylamide; the acrylic acid ester includes 2-hydroxyethyl acrylate, an N-dialkylaminoethyl acrylate, glycidyl acrylate and a fluoroalkyl acrylate; the methacrylic acid ester includes a dialkylaminoethyl methacrylate, a fluoroalkyl methacrylate, 2-hydroxyethyl methacrylate, glycidyl methacrylate and ethylene glycol dimethacrylate; and the alkenyl glycidyl ether includes allyl glycidyl ether.

8. The aqueous fluorine-containing polymer dispersion according to claim 5, wherein the functional group-containing alkenyl compound is selected from the group consisting of acrylic acid, methacrylic acid, itaconic acid, fumaric acid, N-methylolacrylamide, N-methylolmethacrylamide, 2-hydroxyethyl acrylate, 2-hydroxyethyl methacrylate and allyl glycidyl ether.

9. The aqueous fluorine-containing polymer dispersion according to claim 5, wherein the functional group-free alkenyl compound is selected from the group consisting of a conjugated diene, an aromatic alkenyl compound, a divinyl hydrocarbon compound and an alkenyl cyanide.

10. The aqueous fluorine-containing polymer dispersion according to claim 9, wherein the conjugated diene includes 1,3-butadiene and isoprene; the aromatic alkenyl compound includes styrene, α-methylstyrene and a styrene halide; the divinyl hydrocarbon compound includes divinylbenzene; and the alkenyl cyanide includes acrylonitrile and methacrylonitrile.

11. The aqueous fluorine-containing polymer dispersion according to claim 5, wherein the functional group-containing alkenyl compound is used in a proportion of less than 50% by weight based on the weight of the monomer mixture and the functional group-free alkenyl compound is used in a proportion of less than 30% by weight based on the weight of the monomer mixture.

12. The aqueous fluorine-containing polymer dispersion according to claim 1, wherein the proportion of the alkyl acrylate in the monomer mixture is less than 60% by weight.

13. The aqueous fluorine-containing polymer dispersion according to claim 1, wherein the amount of the monomer mixture is 20–90 parts by weight.

14. The aqueous fluorine-containing polymer dispersion according to claim 1, wherein the fluorine-containing polymer has a number-average particle diameter of 0.1–2 $\mu$m.

15. A process for producing an aqueous fluorine-containing polymer dispersion, which comprises emulsion-polymerizing 5–95 parts by weight of a monomer mixture consisting of at least one monomer selected from the group consisting of alkyl acrylates whose alkyl groups have 1–18 carbon atoms and alkyl methacrylates whose alkyl groups have 1–18 carbon atoms and optionally an ethylenically unsaturated compound copolymerizable with the alkyl acrylates and the alkyl methacrylates, in an aqueous medium in the presence of 100 parts by weight of particles of a vinylidene fluoride polymer, wherein the vinylidene fluoride polymer is obtained by emulsion polymerization and is a vinylidene fluoride/tetrafluoroethylene copolymer or a vinylidene fluoride/tetrafluoroethylene/hexafluoropropylene copolymer.

16. The process according to claim 15, wherein the emulsion-polymerization is effected at a temperature of 30°–100° C. for 1–30 hours in the presence of an emulsifier and a polymerization initiator.

17. The process according to claim 16, wherein the emulsifier is an anionic emulsifier, a nonionic emulsifier, a combination of an anionic emulsifier and a nonionic emulsifier, a cationic emulsifier or an amphoteric emulsifier.

18. The process according to claim 17, wherein the emulsifier is an anionic emulsifier.

19. An aqueous dispersion containing a fluorine-containing polymer, which dispersion consists essentially of 95–30 parts by weight (in terms of solids content) of the aqueous fluorine-containing polymer dispersion of claim 1 and 5–70 parts by weight (in terms of solids content) of an aqueous dispersion of at least one resin selected from the group consisting of a water-soluble resin and a water-dispersible resin.

20. The aqueous dispersion according to claim 19, wherein both the water-soluble resin and the water-dispersible resin are contained at a weight proportion of 20/80–80/20.

21. The aqueous dispersion according to claim 19, wherein the water-soluble resin is an N-methylolmelamine resin, an alkylated N-methylolmelamine resin, a water-soluble acrylic resin, a urethane resin, an epoxy resin, a polyester resin, a water-soluble nylon resin, an alkyd resin, a urea resin, a maleinized polybutadiene or a maleinized oil.

22. The aqueous dispersion according to claim 21, wherein the water-dispersible resin is in the emulsion form and the emulsion is a (meth)acrylic emulsion, a vinyl acetate emulsion, an ethylene-vinyl acetate emulsion or a urethane emulsion.

23. An aqueous fluorine-containing polymer dispersion having average particle diameters of 0.05–3 $\mu$m, which is obtained by emulsion-polymerizing 5–95 parts by weight of a monomer mixture of at least one monomer selected from the group consisting of alkyl acrylates whose alkyl groups have 1–8 carbon atoms and alkyl methacrylates whose alkyl groups have 1–8 carbon atoms, and an ethylenically unsaturated compound copolymerizable with the alkyl acrylates and the alkyl methacrylates in an aqueous medium in the presence of 100 parts by weight of particles of a vinylidene fluoride polymer, said monomer mixture being absorbed into the vinylidene fluoride polymer particles and the proportion of the alkyl acrylate in the monomer mixture being less than 80% by weight, wherein the vinylidene fluoride polymer is obtained by emulsion polymerization and is a vinylidene fluoride/tetrafluoroethylene copolymer or a vinylidene fluoride/tetrafluoroethylene/hexafluoropropylene copolymer.

24. The aqueous fluorine-containing polymer dispersion according to claim 1, wherein the vinylidene fluoride polymer is obtained by emulsion polymerization and is a vinylidene fluoride/tetrafluoroethylene/hexafluoropropylene copolymer.

25. The aqueous fluorine-containing polymer dispersion according to claim 23, wherein the vinylidene fluoride polymer is obtained by emulsion polymerization and is a vinylidene fluoride/tetrafluoroethylene/hexafluoropropylene copolymer.

* * * * *